Figure 1:
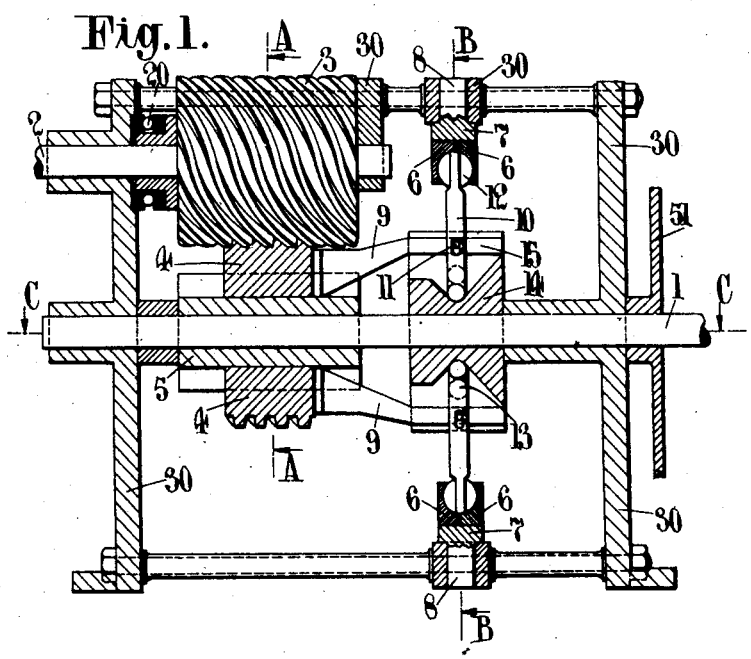

Dec. 13, 1927.

W. J. GEE 1,652,824

VARIABLE SPEED GEAR

Filed June 1, 1925    2 Sheets-Sheet 1

INVENTOR
William John Gee
BY
Byrne, Stebbins & Parmelee
ATTORNEYS

Dec. 13, 1927.
W. J. GEE
VARIABLE SPEED GEAR
Filed June 1, 1925
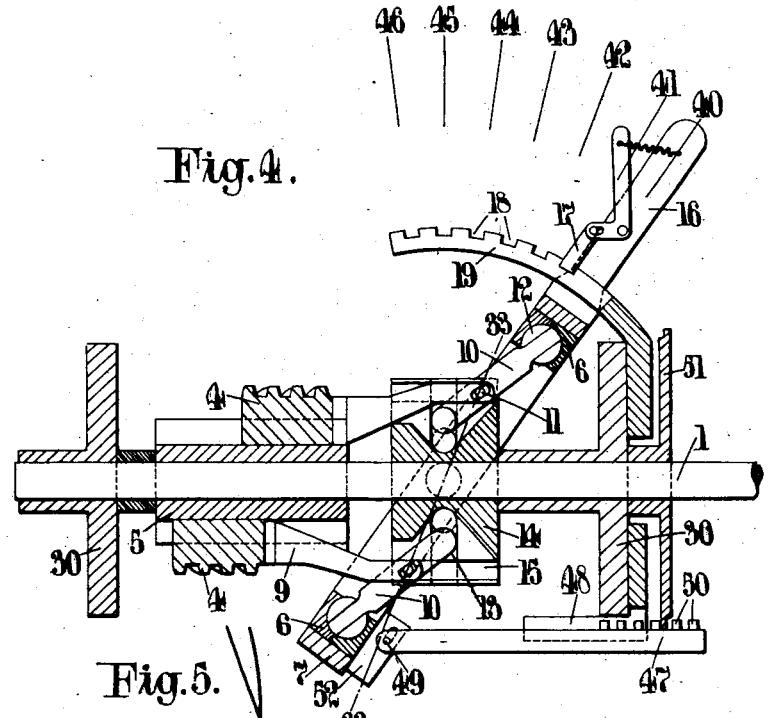
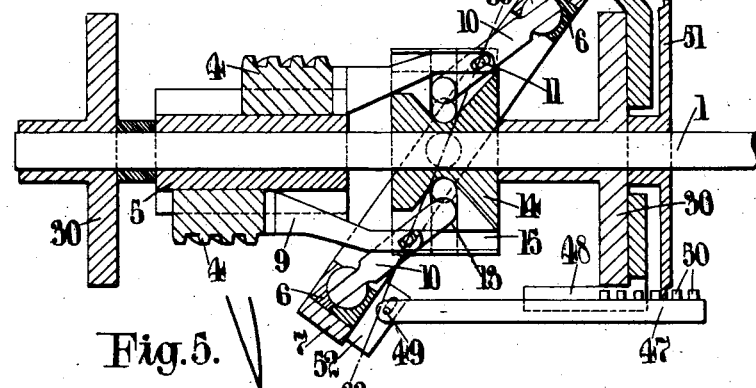
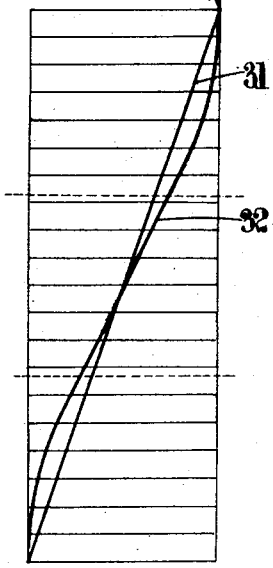
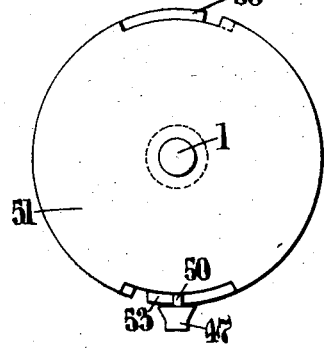
INVENTOR
William John Gee
BY
His ATTORNEYS Patented Dec. 13, 1927.

1,652,824

UNITED STATES PATENT OFFICE.

WILLIAM JOHN GEE, OF LONDON, ENGLAND.

VARIABLE-SPEED GEAR.

Application filed June 1, 1925, Serial No. 34,058, and in Great Britain November 14, 1924.

This invention relates to variable speed gears of the kind described in the inventor's prior Patents Nos. 1,303,287 and 1,372,069 in which variations in the ratio of transmission are obtained by allowing or causing a definite but variable amount of slip or overrunning between the driving and the driven elements.

The improvements forming the subject of the present invention relate in the first instance to the means for controlling the axial movement of the slidable sections, and to the arrangement and construction of the driving and driven members. It has been found that the proposed use of a flat hinged plate or ring, for controlling the movement of the slidable sections (slip) produces a somewhat irregular or jerky drive, owing to the fact that the control is not uniform or equal for all parts or phases of the revolution, but is irregular, the beginning and end of the controlled movement being slow, and the middle of the movement faster. This could be remedied by using a control of spiral form, but, apart from the difficulty of adjusting a control member of spiral form, there is this disadvantage in using a truly spiral control member, that the reversal of direction of the movement of the slidable sections at every half revolution is comparatively sudden, whereas the reversal effected by a flat control member is very smooth and gradual. One object of the present invention is to obtain substantially the effect of a truly spiral control whilst the sections are engaged, whilst retaining the advantage of the smooth reversal of direction and gradual acceleration which a flat control member affords.

Accordingly to the present invention this purpose is achieved by shortening the period of engagement of the driving and driven elements, and introducing as an addition to the flat control member, a compensation movement whereby, during such engagement, and in any position of the control, a uniform control action is attained and an even drive produced.

The invention also consists in making the control positive so as to ensure that the desired speed ratio between the driving and the driven members be obtained under all working conditions and more particularly independently of change of load.

The invention also consists in providing a more positive guide for returning the slidable sections prior to their re-engaging the other element of the gear.

The invention also consists in a construction of the gear elements and a manner of adjusting the control whereby, if desired, the gear may be used as a fixed ratio multiple speed gear, and the use of an adjusting device for exactly registering the slidable sections before re-engagement may be dispensed with.

In a convenient form of gear embodying this invention, one member, for instance the driven member, consists of a suitable externally toothed spiral or helical gear, the teeth of which have a considerable angle or twist. The other member, for instance the driving member, consists of a similar also externally toothed gear divided into a number, say six, sections, which are dovetailed or otherwise mounted slidably in a boss on the driving shaft. These sections are carried round by the rotation of the boss, but may to any permitted extent slide thereon, in the axial direction. The two elements are geared together like the well known helical gears. If the sections of the divided member are not allowed to move axially the drive of one of these elements by the other is in all respects similar to an ordinary helical gear drive. But, if the sections, during their engagement with the worm or spiral of the other member are allowed to move in the axial direction, there will be, during the engagement of any section, a drive of the driven member inversely proportional to the amount of slip or axial movement of the section, so that with a full amount of slip or axial movement there will be no drive of the driven member, and with no slip a full drive of the driven member. Intermediate amounts of slip will give intermediate speeds. The control member consists of a closed cam-path, formed of two races mounted parallel to each other in a holder or casing which is pivoted to the framing of the gear so that by suitable means the control element may be set so as to form, in conjunction with the compensation device, a guide for the movable sections which is either parallel with the plane of rotation of the driving member or parallel with the angle of the spiral teeth of the driving member, or intermediately. The control element, except for the provision made for altering its inclination as required to vary the ratio of transmission, is stationary. The toothed sections of the driving member are connected to the control element through a compensation device constructed as follows. An extended end of each toothed section is connected by a pin and slot or similar connection to a rod or link, at a suitable point between the ends thereof. One end of this link is fitted with a ball, roller or the like, adapted to run in the cam-path of the control element. The other end of the link has a radially sliding engagement with a rotating boss secured to the driving shaft in the centre and in the middle plane of the control member. The length of the link is less than the radius of the cam path of the control member and consequently the inner ends of the links slide in the boss in a radial direction. This sliding movement of the links affects their rocking or controlling movement and brings about the required compensation during the period of engagement.

Assuming by way of example that the control cam-path is set over at an angle corresponding to an intermediate speed of the driven member, there will be an axial movement of each toothed section in one direction during one half revolution of the driving shaft, and then the reverse movement during the succeeding half revolution. Each section, in the present example, will be in engagement with the driven member for about one-sixth of a revolution of the driving shaft. During the first one third of the first half revolution there will be axial movement of the section without engagement. There will be axial movement with engagement or slip drive for the next third of the half revolution, and again axial movement without enagement for the succeeding third of the half revolution. The section is then returned by the control device during the next half revolution. The compensating effect of the intermediate link interposed between the controlled section and the inclined control cam-path occurs mainly or exclusively during the slip drive period but the link has no or practically no effect at both ends of the axial movement of the section, so that whilst the slip is even and constant the change of direction is very smooth and slow. It will be understood that any other suitable kind of intermediate mechanism may be used to obtain an even slip from a flat control member.

In the described construction the sections are all the time in positive engagement with the control member. This ensures their proper movement even when there is no load and prevents them from overrunning during the return stroke.

The adjusting mechanism for causing the sections to engage properly the driven member may be of the type described in prior Patent No. 1,372,069.

In cases where gradual variability is not needed and a number of fixed ratio speeds will fulfill the requirements, the means for adjusting the sections for engagement may, according to this invention, be omitted, and the control adjusted to move only to those positions where successively engaging sections will mesh without the need for any adjusting device. The conditions governing the number of steps or fixed ratios of speed may be seen from the following example. The driven member has 60 teeth, and the driving member is of equal size and is divided into six sections, each of which circumferentially has ten teeth. With the control in the full speed position there will be no axial movement of the sections, and each section will engage the driven member ten teeth away from the point at which the former section engaged. With the control in the no-speed position each section will come into engagement with the driven member at the same place and merely run through it. At, say, one-tenth full speed, each succeeding section will engage the driven member one tooth away from the point of engagement of the former section. In other words, the section will drive the driven member during its engagement, for one-sixtieth of a revolution. With the control at say three-tenths full speed position, each section will engage the driven member three teeth away from the point of engagement of the former section, and so on.

Thus, for the example given, there will be apart from the no-speed position, ten positions of the control element where the toothed sections will engage the driven member, without needing any adjustment, and there would be a ten-speed gear. By doubling the number of teeth, the number of fixed ratio speeds obtainable would be doubled, and within obvious limits of construction, any desired number of fixed ratio speeds may be obtained. It is essential, in thus arranging the gear as a multiple speed gear at fixed ratios to avoid the possibility of an incoming section being jammed by the teeth colliding instead of meshing, and this may conveniently be arranged by a guard, stop or the like rotating with or driven by the driving shaft, which will prevent a movement to adjust the control otherwise than in the correct phase of the revolution of the driving member. Or it may be arranged that the control element be actually moved from one position to another by a trigger, trip or other device operated by the driving shaft so that the adjustment is made at the right time.

It will be obvious that the gear as above arranged is described by way of example only and other mechanically equivalent constructions may be adopted without departing from the scope and spirt of the invention.

The accompanying drawings show by way of example a construction devised for a definite number of fixed speeds.

Figure 2:
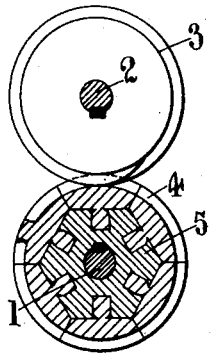
Figure 3:
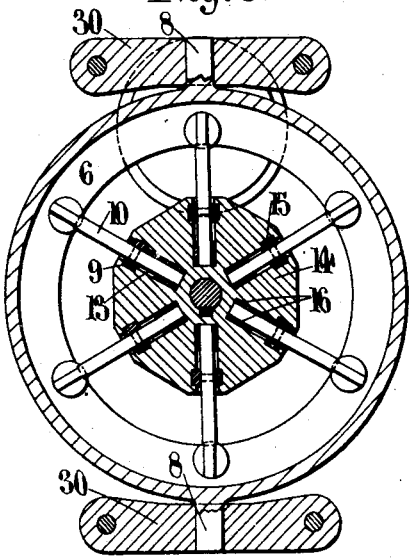

Fig. 1 is a sectional elevation showing the control member in the full speed position, Fig. 2 a section on line A—A of Fig. 1, Fig. 3 a section on line B—B of Fig. 1, Fig. 4 is a section on line C—C of Fig. 1 showing the control member in the no-speed position. Fig. 5 is a diagram explaining the function of the compensating device. Figs. 6 and 7 illustrate in end view and plan the device for controlling the adjusting movement of the control.

1 is the driving shaft and 2 is the driven shaft of the gear. Keyed to the driven shaft 2 is a helical gear wheel 3. This gear may, for instance, have thirty teeth circumferentially and the angle of the spiral may for instance be 24°. The driving gear 4 is, in the construction shown, a helical gear of the same diameter as the gear 3, but of smaller width and is divided into six sections which are slidably mounted in a boss 5 which is keyed to the driving shaft 1. These sections are therefore carried round by the rotation of the boss 5, but are free to slide in the boss longitudinally to an extent limited by the control device. Apart from the longitudinal sliding movement of the sections 4 in the boss 5, the driving and the driven gear mesh together just as ordinary helical gears do. The control device by which the amount of the longitudinal sliding is determined consists of two races 6, 6 fixed in a ring or holder 7 which is pivotally mounted at 8 to the framing 30 of the gear. The control ring 7 is therefore capable of angular adjustment about an axis passing diametrically through its centre. When set for a certain speed ratio of the gear, the control ring 7 remains stationary. Each section of the driving wheel 4 has an extension 9 which engages with a corresponding rocking link 10 by a pin and slot connection 11. Each link 10 is fitted at its outer end with a ball 12 which runs in the races 6, 6. The inner end of the link 10 is, by means of lateral projections 16, in sliding engagement with a radial slot 13 in a boss 14 which is keyed to the driving shaft 1 and therefore rotates with the same speed as the boss 5. The ends of the extensions 9 are preferably guided in longitudinal slots 15 in the boss 14. The effect of the compensating device is to produce during the period of engagement of a section 4 with the gear 3 practically the same longitudinal movement of the section 4 in the boss 5 as would be produced by a true spiral, that is to say, the longitudinal movement will be uniform during the whole period of engagement.

Fig. 5 illustrates diagrammatically the movement produced by the combined action of the control ring and the compensating device. In the case of a true spiral control the relation between the longitudinal movement of a slidable section and its peripheral movement would be represented by the straight line 31 for one half revolution. During the second half revolution the return movement of the sections would take place in the opposite direction, again with a uniform speed. It will be understood that the sliding section would at the end of its stroke have a fairly considerable longitudinal speed, which would have to be suddenly reversed. The curve 32 shows the relation between the peripheral and longitudinal movements of the sections obtaining in the case of the improved control device. It will be seen that during the critical period of engagement of a section with the driven gear, the line is practically a straight line showing that the movement is practically uniform. In the beginning and at the end of each half revolution the speed of the longitudinal movement gradually decreases and becomes practically zero at both ends of the stroke. The lines 31 and 32 are of course developments of the path of a point of a section 4 during half a revolution.

It will be understood that in the position shown in Fig. 1, the compensation device is inoperative and the action is exactly the same as if the section were guided directly in the races 6. There will be no rocking movement of the link 10 during the rotation and no sliding movement of the sections 4 in the boss 5. The gear 4 will, therefore, drive gear 3 in exactly the same manner as if it were an ordinary gear. When the control ring is moved into the position shown in Fig. 4 in which the angle of the line 33 passing from the centre of the boss 14 through the centre of the pin and slot connection 11 corresponds to the angle of the teeth of the driving wheel 4, then the longitudinal sliding movement allowed by the control device during the engagement of a section 4 with the gear 3 will be the same as the longitudinal traverse corresponding to the helix of the section 4 and there will therefore be no drive at all.

It may be pointed out that the angle of the control ring 7 is somewhat greater than the angle of the spiral of the teeth of gear 4. The relevant angle is not the angle of the control ring but the angle of the guided point of the extension 9. This is the angle which determines the amount of slip of each section 4 in the boss 5. The actual angle at which the control ring is set depends on the length of the links and the diameter of the races 6.

In any intermediate position of the control ring between the extreme positions shown in Figs. 1 and 4 there will be an intermediate amount of slip giving a speed between full speed and no-speed.

In the construction here described, each gear wheel has thirty teeth circumferentially and therefore each section 4 has five teeth, but for the sake of clearness a smaller number of teeth has been shown in the drawings. If the driving member during the engagement of a section with gear 3 drives the gear 3 for exactly 1, 2, 3, 4 or 5 tooth distances, then the next incoming section will mesh accurately in the spiral of the gear 3 without needing any longitudinal adjustment, for in all these cases, the control itself will return the section accurately into the meshing position. There will therefore be apart from the full speed position five positions of the control member in which the control member will return the sections exactly into the required position for meshing with the driven gear. The gear is provided with a device for locking the control member in these positions. The device shown consists of a segment 19 having notches 18 with which a spring operated locking pawl 17 fixed to an operating handle 16' of the control ring engages. The six positions, including the full speed position, are indicated by the lines 40, 41, 42, 43, 44 and 45. When the ring is moved beyond the position 45 into the position 46, for example, the gear 4 will drive the gear 3 with a higher peripheral speed than its own peripheral speed. When the ring is moved beyond or past the no-speed position 40 the gear 3 will rotate in the opposite direction. It may also be pointed out that, within limits, the shaft 2 may be the driving shaft and shaft 1 the driven shaft.

The end thrust of the gear 3 is taken up by a ball bearing 20. The end thrust of the sections 4 is taken by the ball races 6.

In cases where it is desired to change the speed ratio whilst the driving shaft is rotating, it is essential to avoid the possibility of an incoming section 4 being jammed by the teeth colliding instead of meshing. To accomplish this object and to render the operation of changing gear ratio simple and certain, I provide the following arrangement, which is illustrated in Figs. 1, 4, 6 and 7.

A slidable rod 47 slidable in grooves or dovetails in a lug 48 carried by the framing 30, is connected by pin and slot, as shown at 49 to a lateral projection 52 of the control ring 7. This rod at the other end has a number of pins or the like 50 suitably spaced. Fixed to and rotating with the driving shaft 1 is a circular guard plate 51. Arranged at the required points on the periphery of this guard plate are appropriately shaped slots or leads 53 and 53¹, of opposite hands.

The operation of this device is as follows:—

The detent 17 being lifted and the handle 16' pushed in the desired direction, one of the pins 50 will prevent the control being moved until the rotation of the driving shaft brings one of the slots or lead 53 or 53¹ into position, whereupon the pin will pass through the slot and allow the control to be moved. The guard-plate 51 is fixed to the driving shaft in relation to the sections 4 so as to make the slots or leads 53 and 53¹ correspond to the engagement period of a section, it follows that the movement of the control from one position to another, in either direction, can only take place in the correct phase of the revolution, and the possibility of the teeth of the sections 4 colliding with the teeth of the wheel 3 on changing ratio is avoided.

It will be understood that the word "uniform" as used herein does not mean a theoretically and perfectly uniform movement, but it means a movement which is for practical purposes uniform, and is different from the movement directly produced by a plane annular guide surface, which is the known swash-plate movement.

It will further be understood that the word "plane" is used herein to indicate that the guide surface is not a helical surface. In other words, corresponding points of the guide surface lie in a plane, but it is not essential that all the points of the guide surface should lie in a plane, the cross-section of the guide surface being quite immaterial.

I claim:

1. A variable speed gear of clutch comprising rotatable driving and driven elements having intermeshing helical teeth, one element being formed in sections, means for sliding the sections of said one element along its axis relative to the other element, speed control means for causing a predetermined extent of movement of the sections of one element along the axis thereof, comprising a plane annular guide surface, guiding elements moving on said surface, and compensating devices connected to said elements and the sliding sections of said gear element.

2. A variable speed gear or clutch, comprising driving and driven elements having intermeshing helical teeth, the teeth of one of said elements being slidable thereon, and speed control means for causing a definite extent of slip of one set of teeth with relation to the other set of teeth, comprising a stationary control ring adjustable about a diametrical pivotal axis and having an annular guide race, and links pivotally connected to the slidable toothed sections, said links having their inner ends movable in rotating radial guides, substantially as described.

3. A variable speed gear or clutch, comprising driving and driven elements having intermeshing helical teeth, the teeth of one of said elements being slidable thereon, and speed control means for causing a definite extent of slip of one set of teeth with relation to the other set of teeth, comprising an adjustable control ring and means for locking the said control ring in fixed positions corresponding to speed ratios at which correct reengaging of the sliding toothed sections takes place, substantially as described.

4. A variable speed gear or clutch, comprising driving or driven elements having intermeshing helical teeth the teeth of one of said elements being slidable thereon, and speed control means for causing a definite extent of slip of one set of teeth with relation to the other set of teeth, comprising an adjustable control device adapted to be locked in fixed positions corresponding to speed ratios at which correct reengaging of the sliding toothed sections takes place, and means for controlling the adjusting movement of the control device from one position to another so that it can only take place in the correct phase of the revolution, substantially as described.

5. A variable speed gear or clutch comprising rotatable driving and driven elements having intermeshing helical teeth, one of said elements being formed in sections, means for sliding the sections of the one element along its axis, and control means connected to said sliding means to decrease or increase the driving effect between the two gear elements any predetermined number of full teeth for each rotation of the sectional element.

In testimony whereof I have hereunto set my hand.

WILLIAM JOHN GEE.